UNITED STATES PATENT OFFICE.

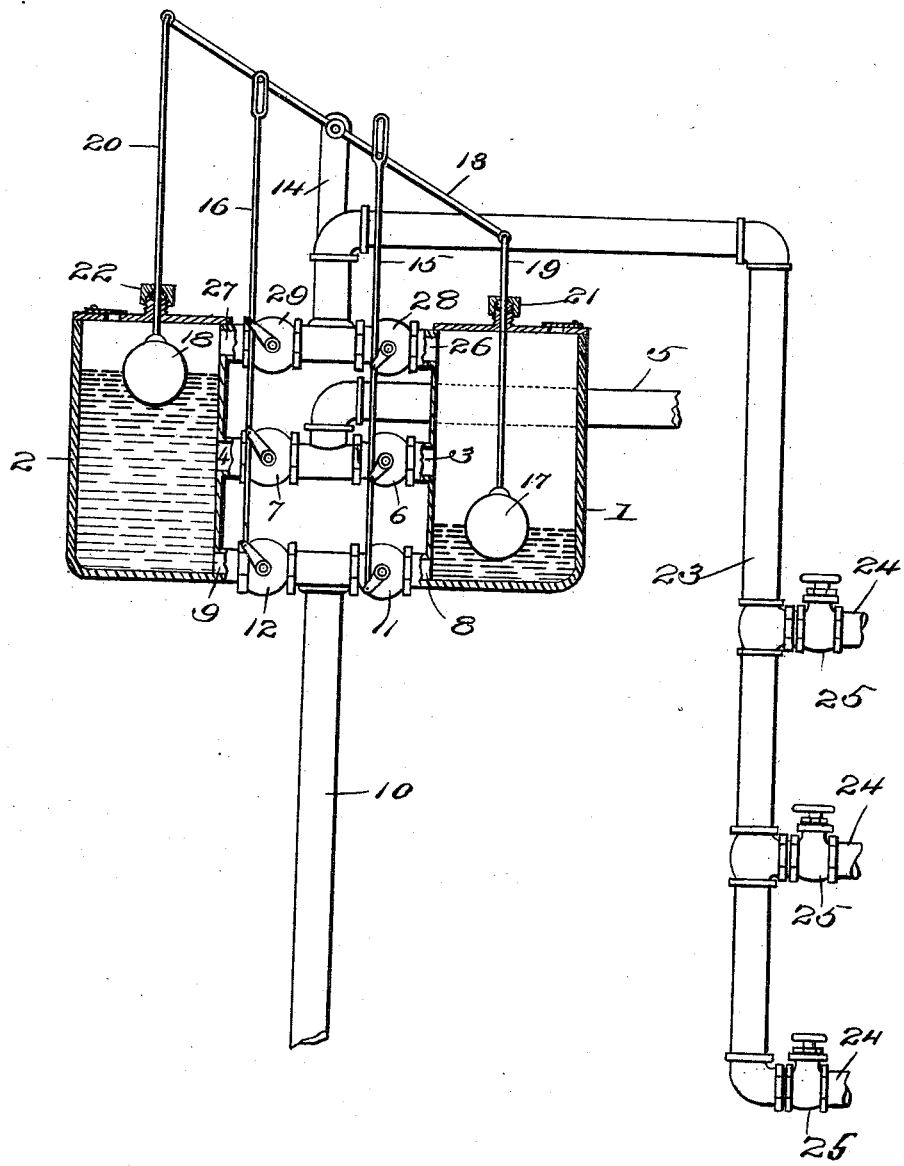

JOHN WILLIAMS THOMAS, OF ALLENTOWN, PENNSYLVANIA.

HYDRAULIC AIR-EXHAUST MECHANISM.

972,039.

Specification of Letters Patent.

Patented Oct. 4, 1910.

Application filed July 28, 1909. Serial No. 510,089.

*To all whom it may concern:*

Be it known that I, JOHN W. THOMAS, a citizen of the United States, residing at Allentown, in the county of Lehigh and State of Pennsylvania, have invented certain new and useful Improvements in Hydraulic Air-Exhaust Mechanism; and I do hereby declare the following to be a full, clear, and exact description of the invention, such as will enable others skilled in the art to which it appertains to make and use the same.

This invention relates to vacuum producing means for any desired purpose as for vacuum cleaning and the like, and has for an object to provide a chamber or chambers adapted to be intermittently filled and emptied, the emptying forming a vacuum which is filled by air from the service pipe.

A further object of the invention is to provide a mechanism for controlling the intermittent opening and closing of valves to admit water to and discharge it from the chambers and to admit air to the chamber while the water is being discharged.

With these and other objects in view, the invention comprises certain novel constructions, combinations and arrangements of parts, as will be hereinafter fully described and claimed.

The drawing represents the present invention practically in side elevation with the chambers shown in vertical substantially diametrical section.

As shown in the drawings two chambers 1 and 2 are illustrated, it being understood, however, that the number of chambers so illustrated is only diagrammatical of the invention. Communicating with the chambers at any approved point are pipes 3 and 4 respectively through which water is admitted from a supply pipe 5 controlled respectively by valves 6 and 7 of any approved type here illustrated as ordinary turning plugs.

For discharging water from the receptacles 1 and 2 pipes 8 and 9 are provided communicating with a pipe 10 reaching to a sewer or any other source of discharge and controlled respectively by valves 11 and 12 also here illustrated as turning plugs.

To control the valves 6, 7, 11 and 12 a lever 13 is fulcrumed upon any convenient structure as an upright 14 and carries links 15 and 16 the former connected with and controlling valves 6 and 11, the latter connected with and controlling valves 7 and 12. To control the lever 13 floats 17 and 18 are mounted within the receptacles 1 and 2 respectively and connected by means of links 19 and 20 with the opposite ends of the lever 13. The receptacles 1 and 2 are, of course, closed at the top and the links 19 and 20 passed through any approved form of stuffing boxes 21 and 22 respectively.

A riser 23 is in communication with any approved form of service pipes 24 controlled by valves 25. The pipe 23 communicates by means of pipes 26 and 27 respectively with receptacles 1 and 2 such pipes 26 and 27 being controlled by valves 28 and 29 similar in all respects to the valves 6, 7, 11 and 12.

In operation water is admitted as through the pipe 4 and valve 7 to the receptacle 2 to raise the float 18 which, upon reaching its upward limit, closes valve 7 and opens valves 12 and 29. The same movement closes valves 28 and 11 and opens valve 6 whereby the water contained in receptacle 2 is discharged through valve 12 and pipe 10 and the receptacle 1 is filled through pipe 3 and valve 6. As the receptacle 2 is emptied of the water as described a vacuum or rarefication is caused at the top of the receptacle and such rarefication is supplied by air to the pipe 23 from the service pipe. The admission of water through the pipe 3, the valves 11 and 28 being closed, fills receptacle 1 and raises the float 17 which, upon rising, reverses the valves, discharging water from the receptacle 1 and producing a vacuum therein while the receptacle 2 is being filled.

What I claim is:—

In a device of the class described, adjacent receptacles, an air inlet pipe extending transversely between the receptacles, an air supply pipe communicating with the inlet pipe intermediate the receptacles, a water inlet pipe extending transversely between the receptacles, a water supply pipe communicating with the inlet pipe intermediate the receptacles, a water outlet pipe extending transversely between the receptacles, a water discharge pipe communicating with the outlet pipe intermediate the receptacles, valves located in each of the transverse pipes upon opposite sides of the communicating pipes, a walking beam fulcrumed above the receptacles, floats disposed within each of the receptacles and pivotally connected with opposite ends of the walking beam, and links connected with the walking beam and adapted to simultaneously operate all of the valves of the transverse pipe upon the same side of the communicating pipes.

In testimony whereof I affix my signature in presence of two witnesses.

JOHN WILLIAMS THOMAS.

Witnesses:
 GEO. W. ANOREY,
 A. P. TROXELL.